Sept. 24, 1968 B. P. EDMONDS ETAL 3,402,967
METHOD AND APPARATUS FOR CONTROLLING THE
DEVELOPMENT OF A SOLUTION MINING CAVITY
Filed March 11, 1966 5 Sheets-Sheet 1

INVENTORS
BYRON P. EDMONDS
JOY ELLEDGE

Chisholm and Spencer
ATTORNEYS

Sept. 24, 1968  B. P. EDMONDS ET AL  3,402,967
METHOD AND APPARATUS FOR CONTROLLING THE
DEVELOPMENT OF A SOLUTION MINING CAVITY
Filed March 11, 1966  5 Sheets-Sheet 2
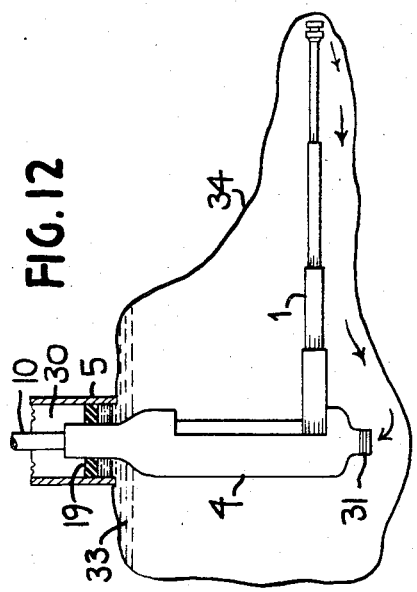
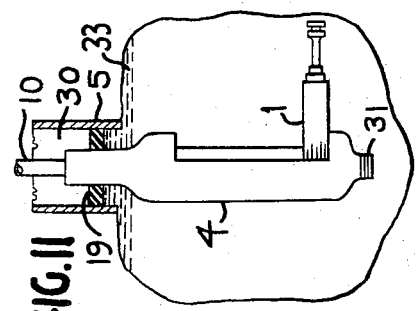
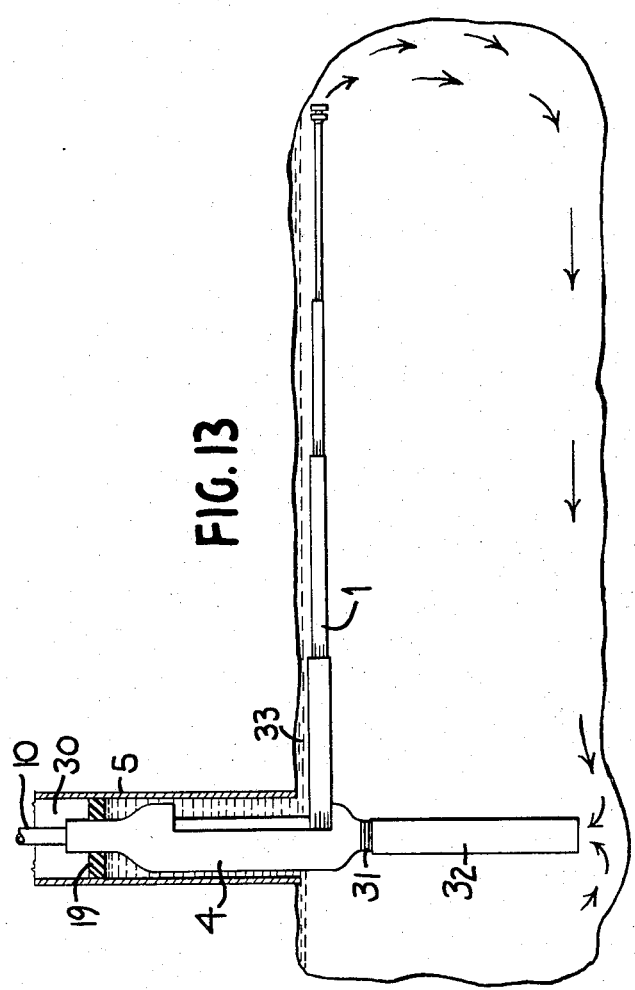
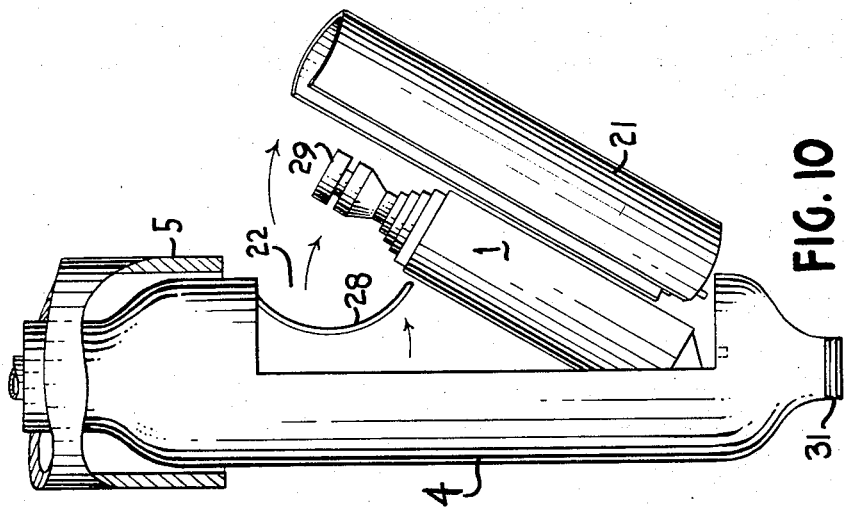
INVENTORS
BYRON P. EDMONDS
JOY ELLEDGE
ATTORNEYS Sept. 24, 1968      B. P. EDMONDS ET AL      3,402,967
       METHOD AND APPARATUS FOR CONTROLLING THE
       DEVELOPMENT OF A SOLUTION MINING CAVITY
Filed March 11, 1966                5 Sheets-Sheet 3
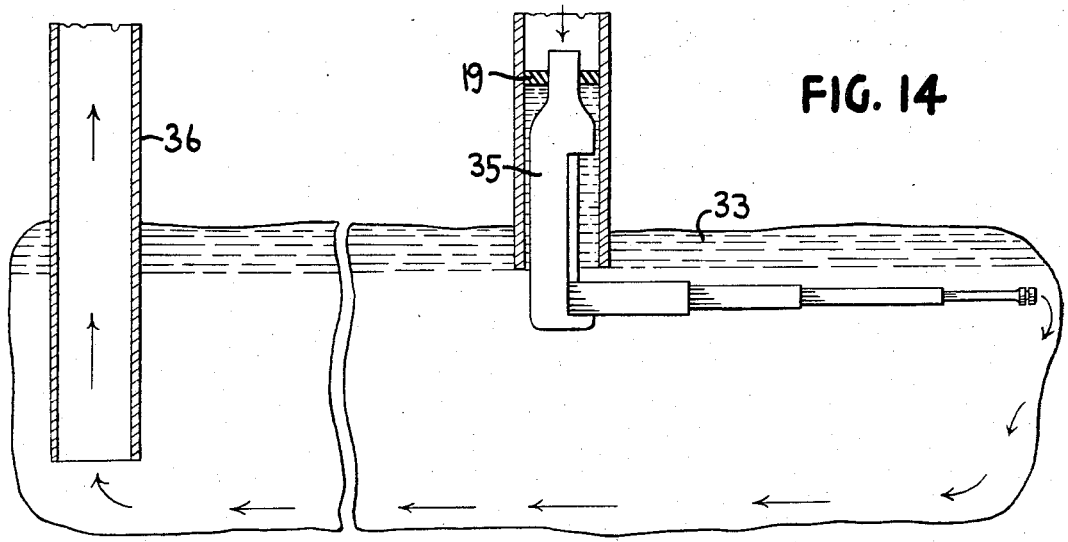
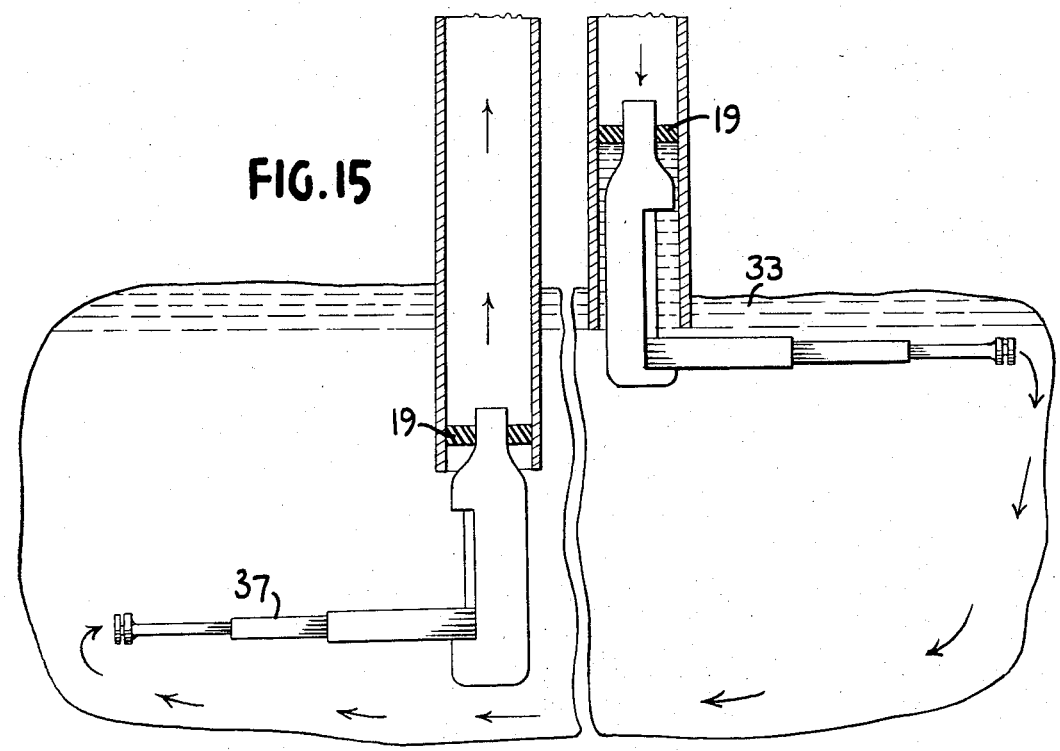
INVENTORS
BYRON P. EDMONDS
JOY ELLEDGE
BY
Chisholm and Spencer
ATTORNEYS Sept. 24, 1968 B. P. EDMONDS ET AL 3,402,967
METHOD AND APPARATUS FOR CONTROLLING THE
DEVELOPMENT OF A SOLUTION MINING CAVITY
Filed March 11, 1966 5 Sheets-Sheet 4

INVENTORS
BYRON P. EDMONDS
JOY ELLEDGE

BY

Chisholm and Spencer
ATTORNEYS

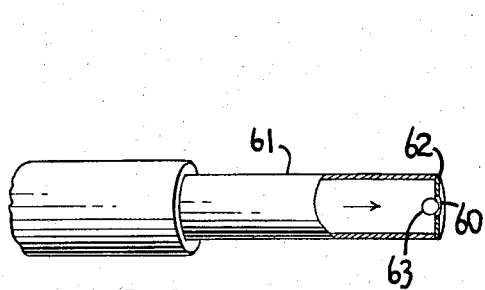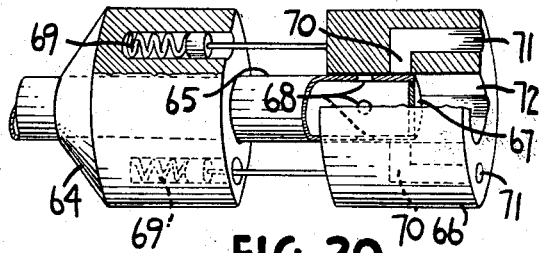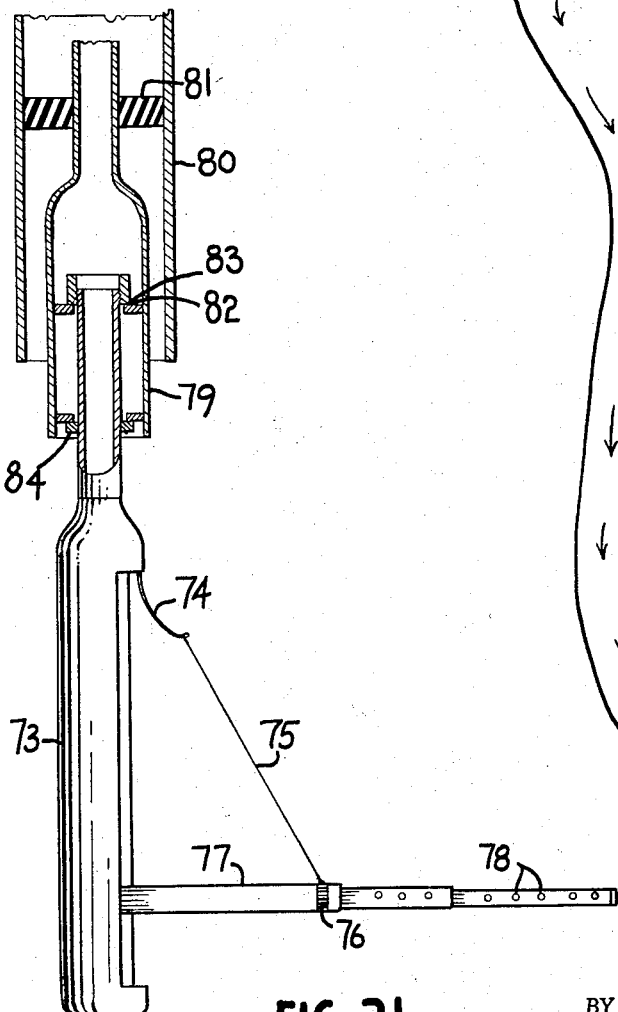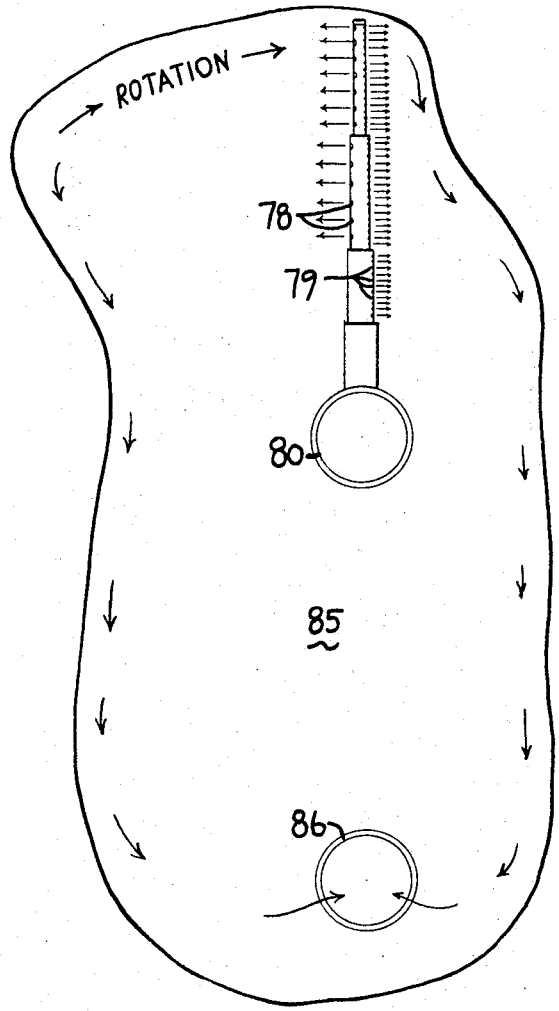

United States Patent Office 3,402,967
Patented Sept. 24, 1968

3,402,967
METHOD AND APPARATUS FOR CONTROLLING THE DEVELOPMENT OF A SOLUTION MINING CAVITY
Byron P. Edmonds, Regina, Saskatchewan, Canada, and Joy Elledge, Gillette, Wyo., assignors to Kalium Chemicals Limited, Regina, Saskatchewan, Canada, a corporation of Canada
Filed Mar. 11, 1966, Ser. No. 533,518
21 Claims. (Cl. 299—5)

ABSTRACT OF THE DISCLOSURE

A method and apparatus for developing a solution mining cavity is disclosed in which there is provided in a cavity a collapsed nest of tubes connected to a solvent supply system. The nested tubes are positioned in a cavity below a bore hole and then extended therein in a lateral direction a substantial and variable distance to position the end of the nest of tubes adjacent the wall of the solution mining cavity. The end of the tubes can be extended as the cavity develops in a lateral direction and can be rotated in circular fashion to develop the cavity laterally around a central axis. Provision for using several nests of tubes simultaneously is also made.

---

Figure 1:
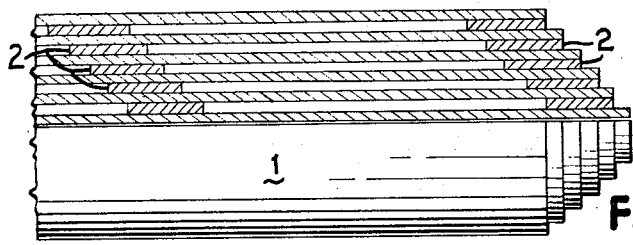

This invention relates to solution mining a soluble. It more specifically relates to an improved method of controlling cavity development. Specific embodiments of the invention are directed toward connecting separated bore holes communicating with a subterranean formation and improving the flow pattern in either a developing or well developed solution mining cavity.

In a typical solution mining operation, a cased bore hole is provided through the earth to an extractable deposit. One or more tubes are then disposed through the bore hole to communicate with the deposit. These tubes provide additional conduits for fluid flow. Typically, solvent is introduced to the deposit through the annulus between the centrally disposed tubing and the casing of the bore hole to contact the extractable deposit. Solution laden with extracted minerals is then withdrawn from the deposit to the surface of the earth through the centrally disposed conduit thereby forming a cavity in the extractable deposit.

At first, when the cavity is small, a solution mining system is normally quite uneconomical. As the cavity size is increased, the economics of the operation significantly improve. The efficiency and productivity of a solution mining cavity may often be greatly improved by developing the cavity in selected directions to produce a cavity of a desired shape. The desired shape of a cavity depends largely on the configuration and mineral composition of the mineable and adjacent deposits.

Economics, productivity, and efficiency of a solution mining operation also generally improve when the injection point at which solvent is introduced to the cavity is separated by a substantial distance from the effluent point at which solution is withdrawn from the cavity. This separation results in an improved fluid flow pattern in the cavity. Lateral separation of the injection and withdrawal points is particularly beneficial. It is usually desirable, for example, to develop a plurality of cavities until they communicate with each other. The internal piping or tubing can then be removed from the bore holes communicating with the respective cavities. One such bore hole can then function as the solvent input conduit while the laterally separated bore hole functions as the effluent withdrawal conduit. It is usually desirable to accomplish this connection of separated bore holes as quickly as possible, preferably by preferentially extracting in selected directions. In this way, most of the product minerals are extracted under more desirable operating conditions.

The practical advantages of preferentially extracting in a selected direction have long been recognized. The desirability of operating with the injection point substantially separated from the withdrawal point, is also well recognized. Thus, methods and devices for accomplishing these objectives have been sought. Such devices and techniques as have been suggested have either been impractical to operate or less effective than desired.

The instant invention provides a simple, inexpensive class of devices and methods which are useful in developing a cavity preferentially in a selected direction. The practice of this invention also provides an improved fluid travel path (flow pattern) in the cavity. In accordance with the instant invention, a nest of collapsed tubes or conduits is introduced to a solution mining cavity. The nest is oriented in the desired direction and extended or telescoped to provide solvent at a selected location. By "extended" is meant increasing the overall length of the nest by a significant amount. The term is intended to include partial extension of the nest as well as complete extension to its maximum overall length. The apparatus of the present invention usually comprises a collapsed nest of conduits, a means for preventing the conduits from separating when the nest is extended, and a fluid carrying means for introducing fluid to the collapsed nest. The fluid-carrying means is connected in practice to a fluid (e.g., solvent) supply means, typically a conduit. The supply conduit typically functions as the means for carrying the apparatus through a bore hole although other means may be employed for this purpose. A means for positioning the nest in a pre-determined attitude or orientation may also be provided. There may also be included a fluid-carrying means for withdrawing fluid from the cavity.

In the practice of this invention, it is now possible to provide a rigid horizontal conduit in a cavity located several thousand feet beneath the surface of the earth. The horizontal conduit may be positioned at any convenient elevation in the cavity. It is conveniently extended to lengths of several hundred feet. A nest suitable for use in this invention may, for example, be constructed of 20 foot sections of commercially available stainless steel conduits with a maximum diameter of 4¼ inches and a minimum internal diameter of about ½ inch. Such a nest is readily run down a conventional 7-inch casing communicating with a cavity more than a mile beneath the surface of the earth. It extends to a length of about 400 feet. About the same extended length is provided by a nest of tubes 12½ feet long with a maximum diameter of about 5½ inches. By using a 400 foot nest in accordance with this invention, bore holes separated by more than 800 feet can be connected extremely rapidly. The connection is effected upon extracting only very limited quantities of minerals. By selecting other materials of construction or other dimensions of tubing, much greater lengths of horizontal conduit can be placed in a cavity in accordance with this invention.

The collapsed nest of conduits may be introduced to the cavity in a variety of ways. Of course, the nest of tubes must be oriented in a substantially vertical position as it travels through a cased bore hole into the cavity. After the nest of tubes enters the cavity and is free from the cased bore hole, it is oriented in the desired direction by suitable mechanical means. According to a preferred embodiment, the tubes are nested and introduced to the cavity in a carrier assembly which houses two conduits in addition to the nested tube. One conduit functions as an influent conduit and is attached to the nested conduits. The remaining conduit passes through the assembly and functions as a withdrawal conduit. Commonly assigned United States patent application, Ser. No. 533,558, filed Mar. 11, 1966, discloses a number of carrier assemblies adaptable for use in the practice of the instant invention. Many other carriers will be suggested to the skilled art.

As the carrier assembly emerges into the cavity, the nested tubing is caused to fall from its substantially vertical orientation to a substantially horizontal orientation. The base of the nest may, for example, pivot on a suitable hinge means. The hinge conveniently includes a stop means to prevent the tube from falling beyond the desired orientation. Alternatively, the fall of the nested tubes may be checked by means such as a strap or sliding sleeve operably connected to some part of the carrier assembly other than the hinge. A variety of mechanical means for horizontally orienting the lateral conduit will be readily suggested to those skilled in the art.

It is often possible to avoid the need for mechanical horizontal orienting means. By properly selecting materials of construction and tube dimensions, a desired specific gravity of the extended conduit (when it is filled with solvent) can be obtained. The solvent normally has a specific gravity considerably lower than the specific gravity of the cavity solution. In addition, the specific gravity of the cavity solution usually increases either steadily or in increments from the roof to the floor of the cavity. Thus, a nest of tubes which has an appropriate weight when it is extended and filled with solvent will automatically orient itself at the desired attitude.

It is also possible to provide a small orifice or port in the tube, usually in the smallest section, to function as a jet when solvent is passed through the nest. The jet is oriented to hold the extended conduit in its desired attitude with respect to horizontal.

The orientation of the telescoping tubes with respect to the compass is accomplished in accordance with well known methods for orienting tools in a bore hole. One convenient method is to place a magnetic compass down the bore hole in fixed relationship to the nested tubes. Orientation can be read directly at the earth's surface on a device adapted to record electrical or magnetic impulses from the compass device. Orientation of the extended tubes in relation to the azimuth can also be determined with the same or similar devices.

Figure 3:
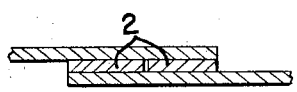
Figure 2:
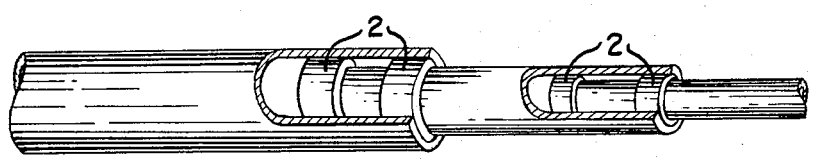
Figure 4:
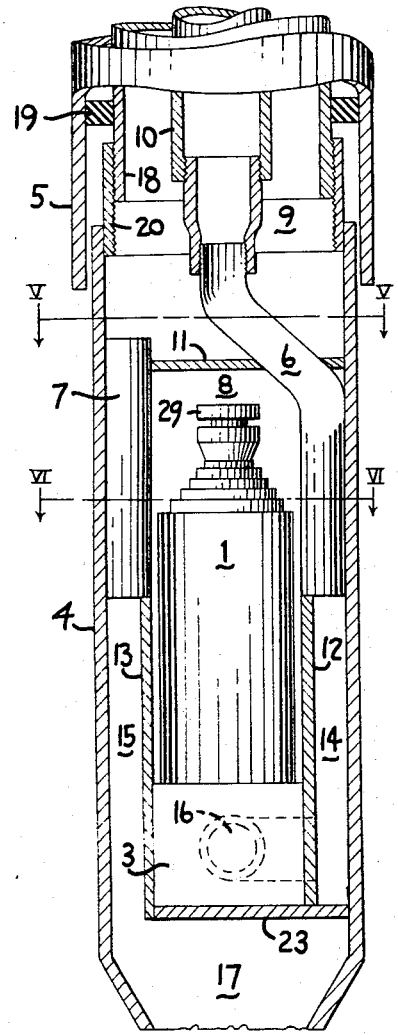
Figure 5:
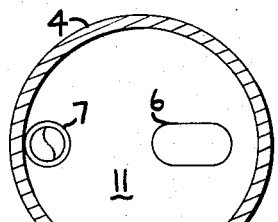
Figure 7:
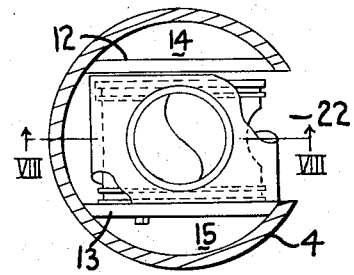
Figure 6:
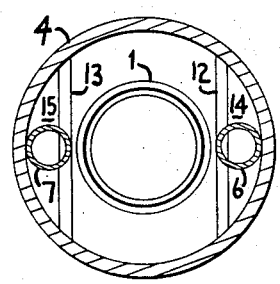
Figure 8:
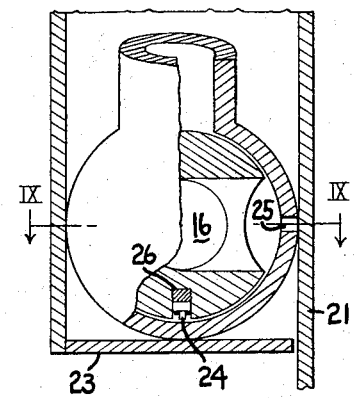
Figure 9:
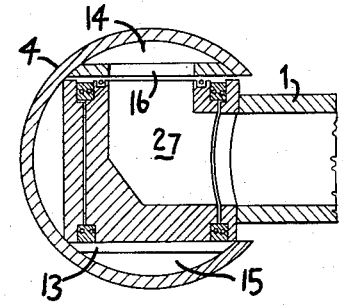
Figure 16:
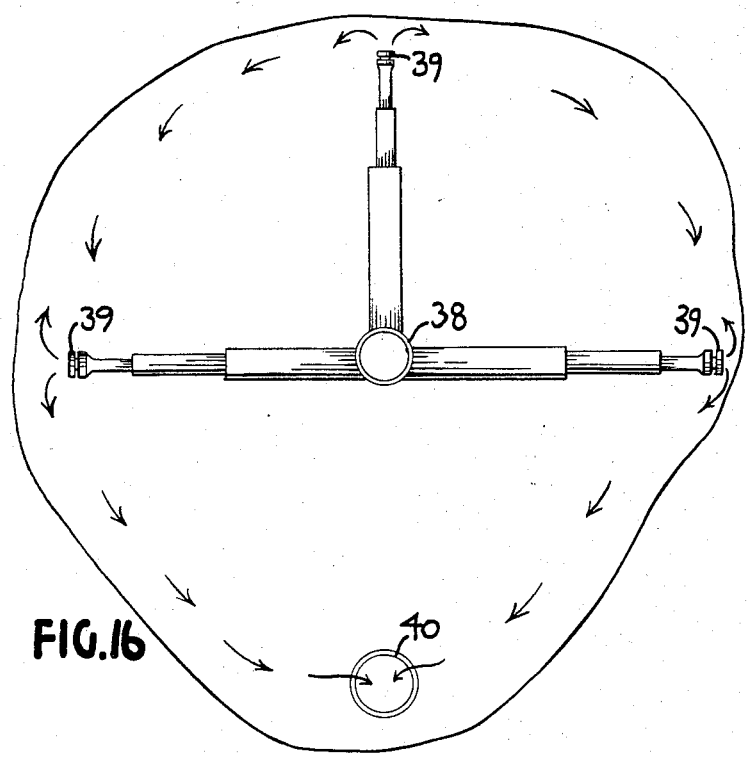
Figure 18:
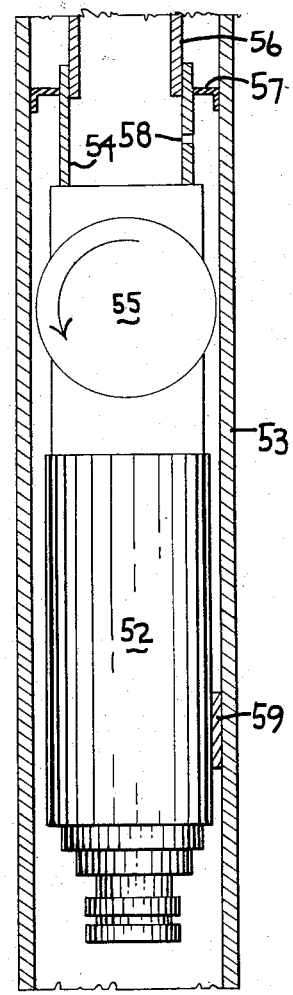
Figure 17:
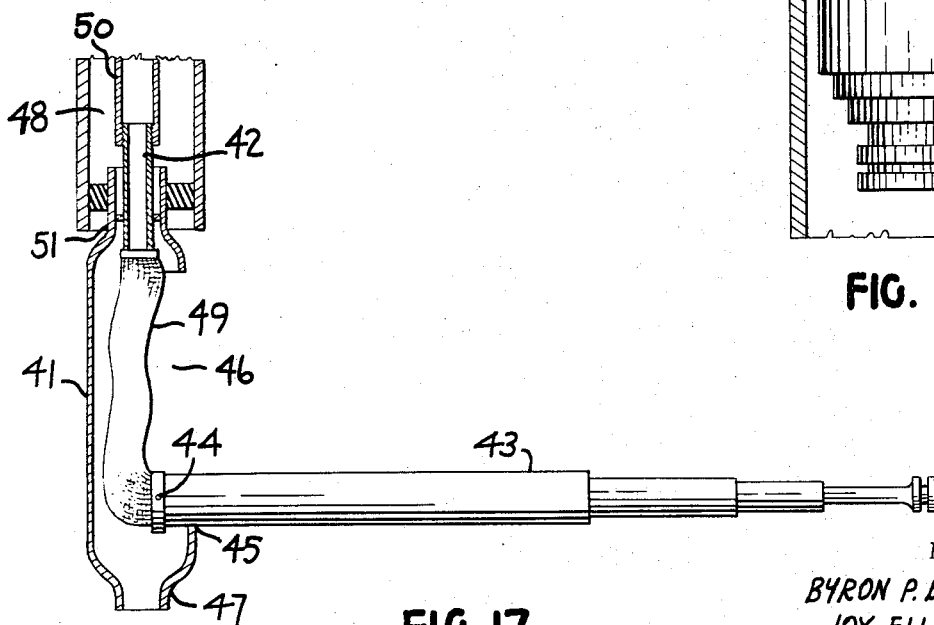

The invention will be more readily understood with reference to the accompanying drawings of which: FIGURE 1 illustrates a collapsed nest of conduits. FIGURE 2 represents a nest of conduits in extended position and FIGURE 3 represents a preferred stop means for preventing the extended tubes from disassociating from each other. FIGURE 4 illustrates a carrier assembly which may be employed for introducing a collapsed tube through a bore hole into a cavity. FIGURES 5 and 6 show selected cross-sections of the carrier assembly illustrated in FIGURE 4. FIGURES 7, 8 and 9 illustrate a preferred hinge mechansm. FIGURE 10 illustrates one way in which a nest of tubes is pushed from a carrier assembly. FIGURE 11 shows a nest of tubes after being introduced to a cavity. FIGURE 12 illustrates a nest of tubes partially extended to contact an extraction surface. FIGURE 13 illustrates an extended nest of tubes horizontally oriented in a well developed cavity. FIGURES 14, 15 and 16 depict various embodiments in which the extended nests are employed in a cavity communicating with a plurality of bore holes. FIGURE 17 illustrates a simplified carrier assembly. FIGURE 18 illustrates an alternative method of introducing a nest of tubes down a bore hole. FIGURES 19 and 20 illustrate preferred end devices. FIGURES 21 and 22 illustrate a specific embodiment.

A typical practice of this invention will be better understood with reference to the drawings. A series of tubes 1 with diameter changes which allow them to slip inside one another are assembled as illustrated in FIGURES 1 through 3. Collars 2 prevent the tubes from coming apart when the nest is extended. Referring to FIGURE 4, the nest of tubes 1 is attached to a hinged valve 3. (See FIGURES 7, 8 and 9). This hinge allows the nest 1 to be pushed through a bore hole while in a vertical position. The valve could be affixed directly to tubing and the nested tube run down the bore hole into the cavity, relying upon the bore hole's casing to hold the nest in an upright position. Because of the possibility of damage to the nested tubes however, it is desirable to place the valve and tubes inside a container or carrier assembly 4 such as that shown in FIGURE 4.

As is seen from FIGURES 4, 5 and 6, the nest of tubes 1 is packed in an upright or substantially vertical direction in container 4 as the container is lowered through a casing 5. It is recognized that a casing may not always be disposed in a strictly vertical orientation in practice. Often a bore hole is provided to a subterranean deposit in a direction with both a vertical and a significant horizontal component. The direction of the bore hole is often altered from time to time between the earth's surface and the subterranean terminus of the bore hole. The overall vertical component is normally much greater than the overall horizontal component, however. Hence, in the instant disclosure the invention is described with reference to vertical bore holes. A nest of tubes being introduced down a bore hole is accordingly described as being in an "upright" or "vertical" position although the invention includes within its scope embodiments in which the tubes are disposed in a horizontal or some other direction, provided the common axis of the nested tubes is approximately parallel to the axis of the access hole in which the nest is disposed.

The carrier 4 includes two fluid-carrying conduits, a supply conduit 6 and a withdrawal conduit 7. The valve 3 and nest 1 are located in a chamber 8 which is blocked off from the annulus 9 external of the tubing 10 by means of a plate 11. The hinged valve 3 is attached to plates 12 and 13 which extend as chords across the carrier 4 to seal off chambers 14 and 15, respectively. The valve is disposed above plate 23 which extends to seal chamber 14 from chamber 17 which openly communicates with chamber 15. Port 16 connects the valve 3 to chamber 14. When the nest is in an upright position as shown, the valve is closed. Chamber 15 openly connects the effluent conduit 7 with the open chamber 17 at the base of the assembly. A further conduit 32 (FIGURE 13) may be provided to communicate with chamber 17 thereby providing a continuing system of conduits extending from the withdrawal point at a selected location in the cavity to the annulus 9. The carrier is adapted, e.g., with threads to be attached to a liner 18. The liner 18 extends only part way up the casing and is sealed to the casing with packing means 19. Because the outside diameter of the carrier 4 is nearly as great as the internal diameter of the casing 4, a reducing means 20 is provided to allow sufficient room between the casing and the liner to accommodate the packing means. The tubing 10 extends all the way to the surface of the earth, Thus, annulus 9 openly connects to annulus 30 (FIGURE 11).

FIGURES 7, 8 and 9 show in greater detail the valve 3. FIGURE 7 shows a view of the valve looking down from the top of the carrier. The carrier is shown with the door 21 (FIGURES 6 and 8) removed so that nest 1 is free to fall through hatch 22. FIGURE 8 shows the valve in the same position but in section looking into port 16. In the valve illustrated, the nest is locked into a position about at right angles to its upright position as it falls from the carrier causing latch 24 to fall into hole 25. The latch may be biased, e.g., with a spring 26. Of course, the nest can be locked into position at any selected angle to its stored position by choosing some other respective positioning of latch 24 and hole 25. FIGURE 9 illustrates the solvent path down chamber 14 through port 16 and elbow 27 into the nest 1 after the nest has been locked into its selected position ready for use.

Referring to FIGURE 10, when assembly 4 is introduced to a point below the base of a cased bore hole 5, the nest 1 is allowed to fall from the assembly toward the horizontal position. It is sometimes desirable to provide a biasing means 28 to encourage the fall of the nest. When the carrier assembly emerges from the cased bore hole, the door 21, if such is provided, falls away allowing the tubes to drop through hatch 22 into roughly horizontal position as illustrated in FIGURE 11 of the drawings. The assembly 4 is typically positioned with the nest near the bottom of the cavity and oriented with respect to the points of the compass. As solvent is injected into the oriented nest, the tubes are extended by hydraulic pressure in a manner similar to the way a hydraulic jack operates until additional extension is impeded by the wall of the cavity (FIGURE 12). Hydraulic extension may be facilitated by providing an end device 29 (FIGURE 10) such as those shown in FIGURES 19 and 20 or any suitable equivalent thereof. Because of the decreasing diameters of the nested tubing, extension is often satisfactory without employing an end device.

Fresh solvent, i.e., solvent unconcentrated with respect to the minerals being extracted, is introduced directly to the extraction surface through the extended nest of tubes. Cavity solution is withdrawn from the activity through a withdrawal nozzle 31 which connects with the annulus 30 between the casing 5 and the internally disposed tubing 10. In other embodiments, the annulus 30 is used as the injection conduit and the tubing 10 connects to the withdrawal point.

FIGURE 13 shows an embodiment where a cavity communicating with a single bore hole has been developed preferentially for a considerable distance. The carrier assembly has been positioned in the casing so that the fully extended nest is near the roof of the cavity. As extension 32 is attached to the withdrawal nozzle 31 which is adapted, e.g., threaded, to receive it. The extension terminates near the bottom of the cavity. Thus, fresh solvent is introduced near the top of the cavity and at a point laterally remote from the withdrawal point.

FIGURES 11, 12, 13, 14 and 15 show an inert layer 33 at the top of the cavity. In many embodiments of this invention, it is desirable to maintain roof control in accordance with techniques well known to the art. The roof of the cavity is protected from extraction at its highest points by introducing to the cavity an inert fluid, e.g., air, mineral oil or refined or unrefined petroleum oil with a specific gravity lower than the specific gravity of the cavity solution. By this means, the lower portions of the cavity roof 34 (FIGURE 12) are extracted until they reach the level of the inert layer 33. In this fashion, horizontal development to a uniform cavity height is encouraged.

FIGURE 14 illustrates an embodiment employing a carrier assembly 35 designed to communicate with a single conduit. This device may be held in place in a casing with packers 19 thereby eliminating the need for tubing to deliver solvent down the cased bore hole. Solvent introduced directly to the cased bore hole flows through the carrier assembly into the nested tubes. Withdrawal from the cavity is through a cased bore hole 36 removed from the bore hole from which the nested tubes extend. Usually the extended nest is oriented in a direction away from the withdrawal bore hole to maximize the separation of the injection and withdrawal points. This embodiment is particularly useful in large producing cavities where it is desired to increase the capacity of the cavity to produce concentrated solution.

According to a further embodiment of the invention, a collapsed nest is provided with locking means, for example, in association with the collars (FIGURE 3) which check the extension of the individual collapsed sections such that when the conduit is fully extended it is locked into position. Thus, the flow can be reversed in the extended tubing without collapsing the nest. The extended nest when locked in this fashion then functions as a withdrawal conduit 37 as illustrated in FIGURE 15.

FIGURE 16 illustrates a further embodiment of the present invention wherein a plurality of tube nests are disposed at the base of a single bore hole 38. In this fashion, solvent is simultaneously introduced toward the cavity walls in several directions thereby developing the cavity more uniformly in several locations. The nests can be introduced in a single carrier or in a series of stacked carriers. The orientation of tubes extending from differing elevations in the cavity may be adjusted so that each injection point 39 is at about the same level. Alternatively, a single horizontal conduit can be gradually swung around the cavity to direct solvent along the walls of the cavity in a sweeping motion. A separated bore hole 40 is shown as a withdrawal conduit. A similar gang of extended conduits can be provided in communication with the withdrawal bore hole.

FIGURE 17 illustrates one of several possible alternative designs for a carrying means for the nested tubes of this invention. The carier shell 41 is similar to the one illustrated by FIGURE 4. The internal system, particularly the hinge mechanism is notably different, however. The valve means 3 is here replaced by a section of flexible tubing 49 constructed of common fire hose fabric or similar material, e.g., rubberized nylon canvas. This flexible connection between the supply conduit 42 and the nest 43 is often desirable because it requires only a small amount of space when the nested tubes are positioned vertically in the carrier assembly. The nest is mechanically hinged on pins 44 at the base of the carrier assembly. When the carrier assembly enters the cavity, the nest falls to a horizontal position in which position it is checked by a ledge 45 provided by the bottom of the hatch 46. The design shown provides a withdrawal nozzle 47 openly communicating with the annulus 48. Injection of solvent is down tubing 50 into supply conduit 42. The assembly is easily adapted to a single conduit system by removing tubing 50 and conduit 42 and attaching flexible tube 49 directly to the neck 51 of the carrier 41. Many other carrier designs will be readily suggested to the skilled art.

The carrier assemblies employed in the practice of this invention conveniently house a collapsed nest of tubes with lengths nearly as great as the height of the cavity. Often the cavity height in a small developing cavity will be less than about 50 feet, sometimes no more than 10 or 20 feet. It is practical to use a carrier assembly of any length which can be positioned vertically in the cavity such that the latch clears the base of the bore hole casing. Thus, in a cavity 50 feet high. individual tube lengths can be nearly 50, e.g., 49½ feet long. If the collapsed nest, when it assumes an extended position, is too close to the bottom of the cavity, the carrier assembly is conveniently withdrawn part way up the bore hole, e.g., 45 feet. In this fashion, the nested tubes are positioned in the upper portion of the cavity. Alternatively, the extended nest may be oriented at an angle from the horizontal to place the injection point, i.e., the end of the smallest tube, at the desired elevation.

When it is desired to remove a carrier assembly from the cavity, the expanded nest of tubes may be shorn off the casing and abandoned in the cavity. If it is desired to recover rather than abandon the collapsed nest, the nest may be attached to the carrier assembly by means of a safety hinge or catch. This safety means may, for example, be adapted to shear when the collapsed tube is pulled against the casing, thereby allowing the tube to fall into a vertical position suspended from the bottom of the carrier assembly. It can then be pulled up the cased bore hole and recovered at the surface of the earth. According to some embodiments, the direction of fluid flow through the extended tubes is reversed thereby causing the tubes to nest and facilitating their removal. The skilled art will readily devise other methods to retrieve a nest of tubes from a cavity. In any event, abandonment of the nest in a cavity does not represent an undue expense compared to normal operating costs of a solution mine, particularly in light of the substantial benefits realized by the practice of this invention.

FIGURE 18 illustrates an embodiment of the present invention wherein a collapsed nest of tubes 52 is introduced down a casing 53 without a specialized carrier assembly. According to this embodiment, the nest 52 is oriented with the smallest tub down. The nest is connected to a liner 54 through a valve means 55. The valve is adapted to prevent fluid flow therethrough when the nest is oriented as shown in the drawing. The valve is hinged with a rotational bias as indicated to bring the nest to a horizontal position when it emerges from the casing. A stop means may be built into the valve to check the lift of the nest when it is raised to a preselected orientation. The liner, valve and nest are pushed down the casing on the end of tubing 56. The liner is usually suspended in the casing by packing means, preferably expandable packers, known to the art. The tubing may then be removed. The nest may be held in collapsed position by pressure built up in the casing beneath the nest as it is shoved down the casing. Alternatively, the tubes may be held in nested position by means of a cord or wire disposed internally to the nest and connecting the smallest to the largest tube. The cord or wire is readily broken by hydraulic pressure when solvent is forced through the nest. Packer cups 57 may be provided to increase the pressure beneath the nest. To avoid excessive pressure build-up, a port 58 may be provided for pressure relief. The port is closed in accordance with well known techniques after the nest is emplaced. A sliding shoe 59 attached to the nest holds the nest away from the casing wall in opposition to the hinge bias to protect the nest from damage as it is lowered down the bore hole.

The nest of tubes illustrated in FIGURE 18 may be retrieved from a cavity quite readily. By reversing solvent flow in the tubes, the tubes are caused to nest. The liner is retrieved in accordance with well known techniques. The resistance of the base of the casing on the outside tube of the nest forces the hinged valve into its original position. The nest may then be pulled up the casing.

A principal objective of the nested tubes of this invention is to continuously provide a supply of fresh solvent to a retreating extraction surface. Thus, the solvent injection point is desirably advanced from time to time toward the wall of the cavity. FIGURES 19 and 20 illustrate end pieces which may be employed to control the position of the injection point. Nests may be constructed to resist extension to a selected degree within wide limits. While one nest may extend readily without an end device of any kind, a different nest may be constructed, often purposely, with built-in resistance to extension. An end piece is then often employed to encourage extension of the tubes, either automatically or as desired.

A simple but effective end device is that illustrated by FIGURE 19. This device consists merely of an orifice 60 in the smallest section 61 of the nest. The orifice is sufficiently small to cause the tubes to extend by internal pressure. The orifice is conveniently provided in an end plate 62 attached to the tube 61. The action of this system is enhanced by charging a resilient plug means, e.g., a hollow plastic or rubber ball 63 into the influent conduit to block the orifice thereby causing the tube to extend until it reaches the cavity wall. When the tube meets the cavity wall, it is stopped from extending further. Fluid pressure then builds up inside the extended tube and forces the ball through the orifice. When it is desired to extend the tubes further, an additional ball or equivalent is dropped into the influent conduit.

The end device illustrated by FIGURE 20 functions as a spring loaded slide valve. A stationary portion 64 of the valve is fixed to the end section 65 of the nested tubes. A second portion 66 slips over the end section 65. The terminal end of tube section 65 is plugged either permanently or with a removable plug means 67 as shown. One or more ports 68 are provided in the end section. These ports are sealed with the movable portion 66 of the valve which is biased by spring means 69. With the ports 68 sealed, the nest extends hydraulically until the biased portion 66 contacts the cavity wall. The resistance of the wall forces the biased portion 66 to slide along tube 65 until ports 68 line up with internal openings 70. There may be provided individual openings for each port or one annular opening may communicate with several ports. The openings 70 communicate with injection channels 71. Thus, when the pressure of the cavity wall forces alignment of ports 68 with openings 70, solvent flows out injection channels 71 to contact the cavity wall. In this fashion, a turbulent flow of fresh solvent is automatically delivered to the receding cavity wall until the nest of tubes is fully extended. After the cavity wall has receded beyond the reach of the fully extended tubes, the pressure in the supply line may be substantially increased to remove plug 67, thereby allowing continuous flow of solvent through injection port 72. Alternatively, the direction of flow in the supply line may be reversed thereby causing the extended tubes to nest. Hydraulic renesting of the tubes is greatly facilitated because the entire tube system is sealed. The nested tubes and sliding valve are then retrieved.

The telescoping conduits of this invention may be of any suitable material and configuration. Thus, for example, high-strength tubing made from copper, aluminum or stainless steel is commercially available and is quite satisfactory in the practice of the instant invention. Other rigid materials such as other metals or suitable glass, plastic or resinous materials, e.g., hard rubber, may also be employed. Although commercially available cylindrical tubing is convenient and practical to use, the cross-sectional configuration is not critical to the instant invention. Satisfactory tubing with oval, square, or rectangular cross-section is also commercially available. A nest of tubes with non-circular cross-section is often preferred because one section of such a nest will not rotate with respect to adjoining sections. Such rotational stability is desirable when it is desired to orient an orifice or tool, e.g., a logging device, carried by the tubing in a desired direction. Of course, circular tubes are adaptable to avoid rotation if desired.

FIGURES 21 and 22 illustrate one embodiment in which a nest 77 of noncircular cross-section is often more convenient to employ than a nest of circular cross-section. As is seen from FIGURE 21, a nest of square tubes is packed in the same type of carrier employed in other embodiments of the invention. In the particular carrier shown the nest is biased by means of a bow spring 74 to fall from the carrier. The fall of the nest is checked by means of a cable 75 or equivalent means, e.g., a chain, which extends from the spring 74 to a clamp 76 attached to the nest 77. A series of holes 78 are provided along one side of at least a portion of the tubes. On the opposite side of the tubes a series of many more holes of much smaller diameter 79 are provided (see FIGURE 22). The holes are usually provided in the tubes of smaller cross-section although they are often provided in all of the sections depending largely on the distance between the access bore hole and the extraction surface.

The carrier 73 is suspended from a second assembly 79 which may be termed a bearing assembly. This bearing assembly is packed off to the access casing 80 in the usual way with packing means 81. The carrier assembly 73 is free to rotate with respect to the bearing assembly 79 via bearing surfaces 82 and 83. Rotation is additionally facilitated by providing ball or roller bearings in association with the bearing surfaces. Means 84 may also be provided to hold the bearing surfaces in proper relationship.

In practice, the device illustrated in FIGURE 21 is installed through an access hole 80 in the usual way.

The next is hydraulically extended into the extractable formation as illustrated by FIGURE 22. Once extended, or partially extended, the forces resulting from solvent flow through holes 78 and 79 urge the tubes to rotate in the direction of the smaller holes 79. The solvent from these smaller holes extracts the deposit. The force from the larger reactive jets 78 continuously urge the tubes to the proximity of the extraction surface. Solution withdrawal from the cavity 85 is through a second bore hole 86. In other embodiments, solution withdrawal may be through tubing disposed through the bearing assembly and communicating with a flow passage in the carrier assembly.

Although the invention is described herein with reference to selected specific embodiments and devices, it is not intended to restrict the invention to the specific uses described in detail herein. According to this invention, a nest of conduits is introduced through a confined access such as a bore hole to a remote space such as a subterranean cavity. The nest is then oriented in a desired direction and extended, e.g., hydraulically. Although the invention has primary application for delivering solvent to a desired location in a solution mining cavity, it is useful for many other applications Thus, for example, this invention provides a means to locate a device on a rigid horizontal member from a vertical shaft of limited dimension. The vertical shaft need not be a bore hole communicating with a solution mining cavity. The invention is also useful in developing subterranean passages which have no specific connection with solution mining techniques, for example, to relieve subterranean pressures, to tap subterranean gas pockets or to deliver sealants to porous formations.

We claim:

1. Solution mining apparatus suitable for controlling the development of solution mining cavities comprising a series of conduits constructed and arranged to permit them to be nested, means associated with said conduits to prevent said conduits from detaching from each other when the series is extended from nested position, fluid carrying connecting means connected to the conduit of largest cross section and constructed and arranged to permit the fluid carrying connecting means to be selectively oriented with respect to said series of conduits, means associated with said series of conduits and said fluid carrying connecting means to position them in a solution mining cavity, and means to extend said nested conduits laterally into said cavity a substantial and variable distance from said means connecting said fluid carrying connecting means and said conduit of largest cross section.

2. The apparatus of claim 1 wherein the conduits are metallic cylinders and the stop means are annular collars external to the male and internal to the female connections of adjacent conduits in the nest.

3. The apparatus of claim 1 wherein the fluid-carrying connecting means is a flexible tube.

4. The apparatus of claim 1 wherein the fluid-carrying means is a mechanical hinge having two portions with ports provided in each portion such that when the nested tubes are in a first position with respect to the second portion the port of the first portion is out of communication with the port of the second portion and when the tubes are orientated in a second selected said position the port of the first portion is in communication with the port of the second portion of said hinge means.

5. The apparatus of claim 4 including fluid supply means connected to the second named portion of the connecting means.

6. The apparatus of claim 5 including a fluid-carrying means in addition to the fluid supply means and out of direct open communication therewith.

7. The apparatus of claim 4 wherein the second named portion of the connecting means is attached to a fluid-carrying conduit said fluid-carrying conduit being suspended from a bearing means and freely rotatable thereon.

8. The apparatus of claim 7 wherein the bearing means is adapted to be suspended internally from a cased bore hole.

9. The apparatus of claim 7 wherein a plurality of ports are provided in one side of at least one of the conduits and at least one large port is provided in the opposite side of at least one said conduit.

10. Apparatus for developing a solution mining cavity comprising a series of conduits having a common axis and sized to allow them to be nested, means associated with said conduits to prevent said conduits from detaching from each other when the series is extended from nested position and fluid-carrying connecting means comprising a first portion connected to the conduit of largest cross section in said series and a second portion in movable relationship with said first portion to permit the common axis of said conduits to be selectively oriented with respect to said second portion, a carrier assembly adapted to house said nested conduits while the nest is being introduced to a subterranean cavity and including a hatch through which the nest can fall after it has passed through the bore hole into the cavity.

11. The apparatus of claim 10 wherein the carrier assembly includes a withdrawal conduit for removal of fluids from said cavity.

12. The apparatus of claim 10 wherein the carrier assembly includes a removable door over the hatch, said door being held in place by frictional pressure while it is in the bore hole.

13. The apparatus of claim 12 wherein the door is biased to fall away from the carrier assembly as the assembly emerges from a bore hole into a cavity.

14. A method of developing a cavity located in a subterranean formation which comprises providing through a bore hole to the cavity a collapsed nest of telescoping conduits, the largest of said conduits being connected to a supply conduit, orienting said nest in a direction with a substantial horizontal component, hydraulically extending the nest by introducing fluid to the nest through said supply conduit until the extended end of the nest is in the proximity of the cavity wall and feeding solvent through the extended nest to extract the cavity wall.

15. The method of claim 14 wherein the extended length of the nest is substantially longer than the initial distance between the bore hole and the cavity wall at the time the nest is introduced to the cavity and the nest is continuously extended into the wall as extraction of the wall proceeds thereby forming a subterranean passageway extending from the cavity into the formation adjacent to the cavity wall.

16. The method of claim 15 wherein the subterranean passageway is developed until it openly communicates with a second bore hole.

17. The method of claim 15 wherein the nest of conduits is adapted to be freely rotatable with respect to the bore hole, extraction ports are provided along one side of the conduits, solvent is fed through the extended nest and through said ports to extract the subterranean formation and the nest is rotated with respest to the bore hole to keep the extraction ports in the proximity of the unextracted formation.

18. The method of claim 17 wherein the nest is caused to rotates in the desired direction with respect to the bore hole by the action of solvent flowing through ports provided in the conduits.

19. The method of increasing the effective lateral separation of two points in a cavity at which fluid carrying means openly communicate with the cavity solution in said cavity which comprises introducing to the cavity a collapsed nest of tubes such that the interior of said nest openly communicates with one of said points causing said point to openly communicate with the cavity solution only through said nest, orienting said nest in a direction away from the other of said points and feeding fluid to said nest thereby extending said nest and relocating the point at which said nest openly communicates with the cavity solution.

20. The method of claim 19 wherein the point at which the extended nest openly communicates with the cavity solution is employed as a solvent injection point.

21. The method of claim 19 wherein the nested tubes are adapted to lock into extended position, said tubes are extended until they lock into said position and thereafter the point at which said nest openly communicates with the cavity solution is used as a withdrawal point for cavity solution.

References Cited

UNITED STATES PATENTS

| | | | |
|---|---|---|---|
| 955,952 | 4/1910 | East | 285—165 X |
| 1,769,944 | 7/1930 | Crisp | 239—281 X |
| 2,198,821 | 4/1940 | Jessup | 166—100 |
| 2,776,168 | 1/1957 | Schweda | 285—165 X |
| 2,822,158 | 2/1958 | Brinton | 299—5 X |
| 3,070,361 | 12/1962 | Pew | 175—67 X |

ERNEST R. PURSER, *Primary Examiner.*